United States Patent [19]

Leveraus

[11] 4,216,524
[45] Aug. 5, 1980

[54] INDICATOR LIGHTS

[75] Inventor: James E. Leveraus, Milwaukee, Wis.

[73] Assignee: Allis-Chalmers Corporation, Milwaukee, Wis.

[21] Appl. No.: 945,872

[22] Filed: Sep. 26, 1978

Related U.S. Application Data

[63] Continuation-in-part of Ser. No. 744,130, Nov. 22, 1976, abandoned.

[51] Int. Cl.² .............................................. B60Q 1/00
[52] U.S. Cl. ....................................... 362/61; 40/573; 362/23; 362/251; 362/276; 362/306; 362/346; 362/390
[58] Field of Search .................. 40/573; 362/251, 276, 362/306, 23, 61, 346, 352, 390, 369

[56] References Cited

U.S. PATENT DOCUMENTS

| | | | |
|---|---|---|---|
| 2,201,044 | 5/1940 | Langdon | 362/369 |
| 3,015,718 | 1/1962 | Petri . | |
| 3,153,782 | 10/1964 | Madansky . | |
| 3,665,459 | 5/1972 | Dupree . | |
| 3,789,945 | 2/1974 | Hansen | 180/90 |
| 4,006,546 | 2/1977 | Anderson | 40/573 |

FOREIGN PATENT DOCUMENTS 1087029 8/1960 Fed. Rep. of Germany .

*Primary Examiner*—Monroe H. Hayes
*Attorney, Agent, or Firm*—Arthur L. Nelson

[57] ABSTRACT

An instrument panel including a lighting circuit, lights and signal indicators mounted on the instrument panel in a manner for ease in assembly and convenience for servicing. Indicator lights on the instrument panel will signal various operating conditions of the engine and the tractor. A cable is connected between the lighting circuit which is formed by a printed circuit on a circuit board and a sensing circuit which senses the sensed conditions of the engine and tractor. Light bulbs are positioned in compartments which are covered by windows carrying a symbol to indicate to the operator the operating condition of the tractor. The wiring is simplified by incorporating the connecting wires in a cable and a connector with a plug and socket arrangement for connecting the light circuit and sensor circuits for a simplified assembly and repair of the system in general.

10 Claims, 11 Drawing Figures

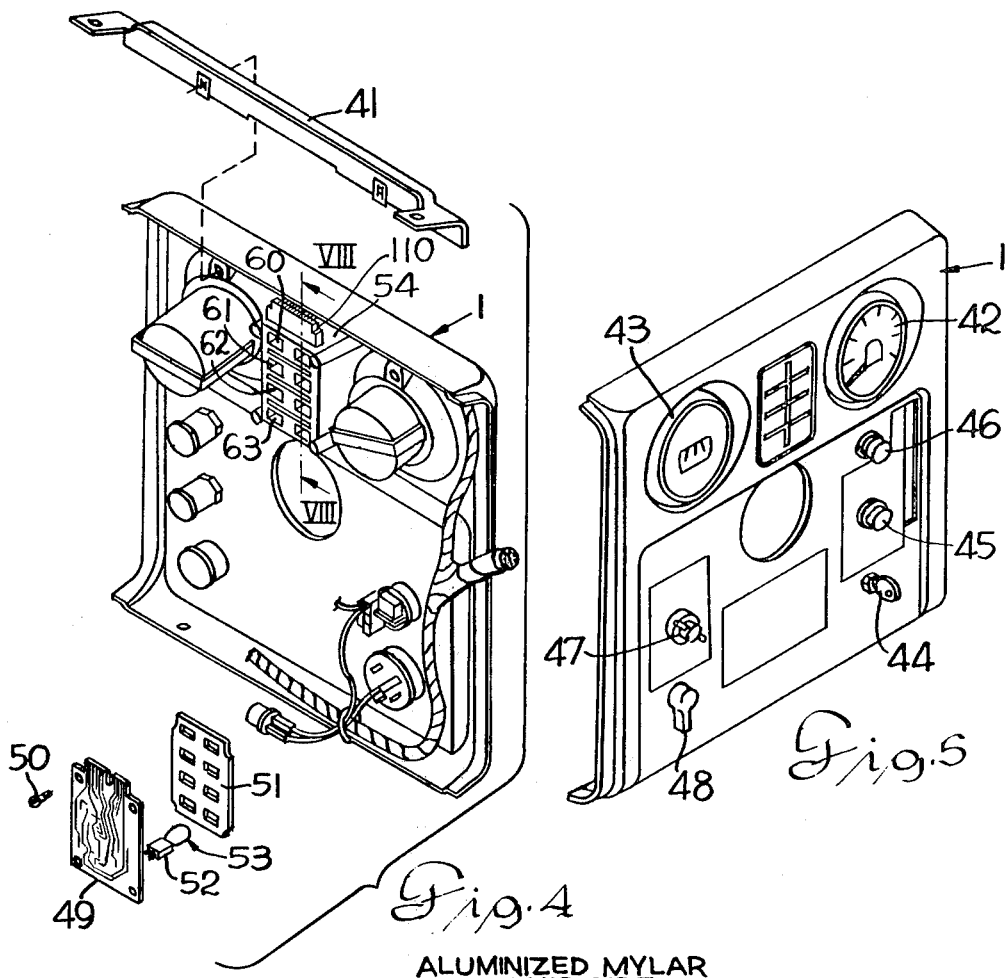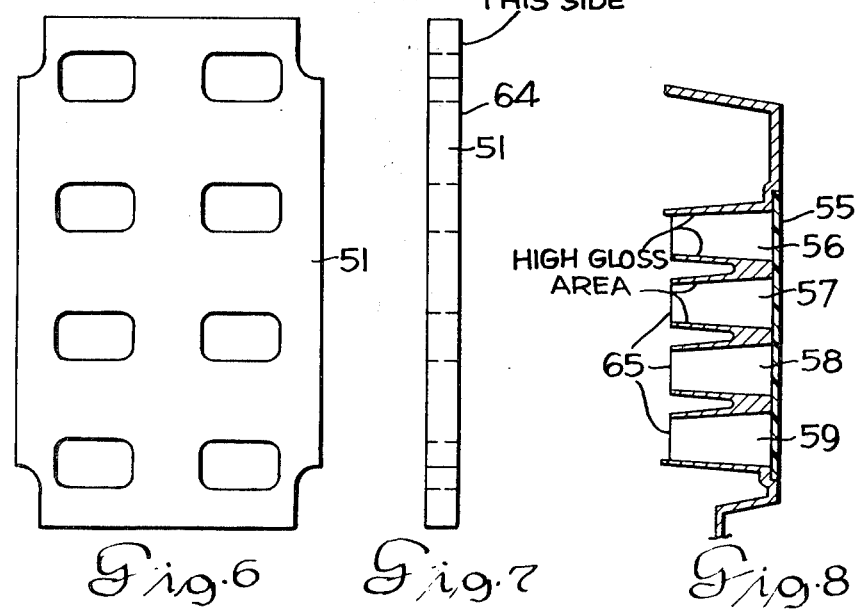

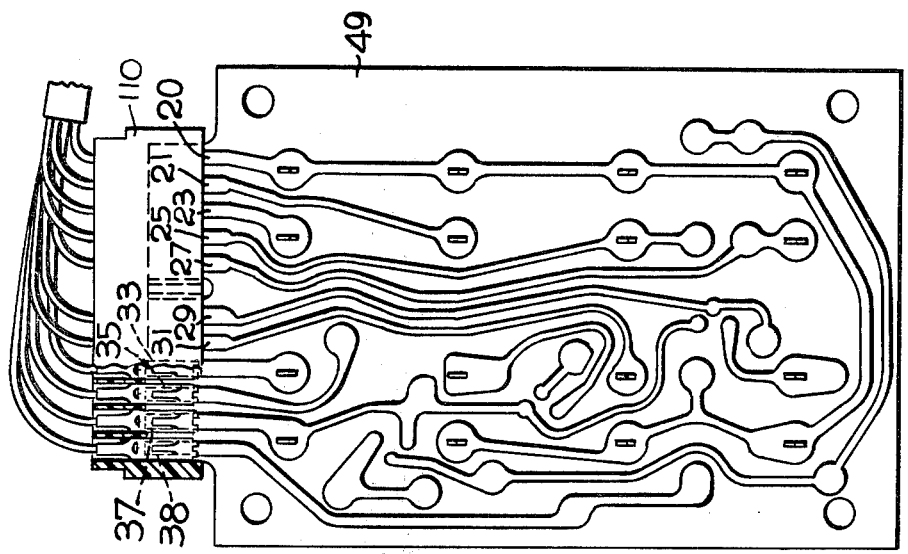
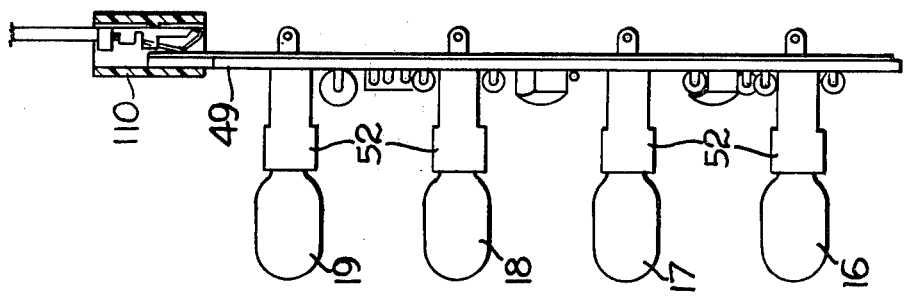
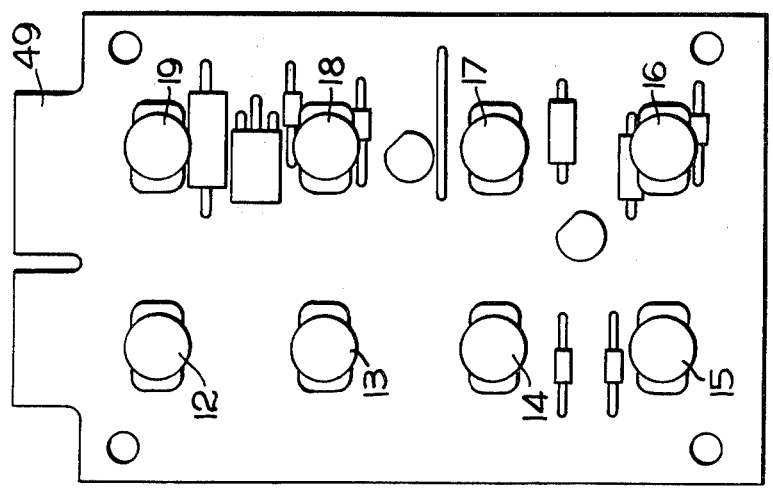

INDICATOR LIGHTS

This is a continuation-in-part application of Ser. No. 744,130, filed Nov. 22, 1976, now abandoned.

This invention relates to an instrument panel on the vehicle and more particularly to a lighting assembly including a compartmented panel with lighted windows for indicator lights and a circuit board supporting light bulbs and circuit components for lighting the windows in response to sensed conditions on the vehicle.

Instrument panels on motor vehicles provide a supporting means for various controls and indicators, such as, meters, lights, gauges, switches and so on. The indicators are often electrical in nature and consequently, electrical wires are used to supply an electrical signal responsive to a sensed condition on the motor vehicle. The complexity of the modern vehicle and particularly tractors are increasing as the need for accessory equipment for operating auxiliary equipment increases. Accordingly, the instrument panel on the modern tractor requires a maze of wiring which is becoming increasingly difficult to assemble as well as service.

Accordingly, this invention provides a means whereby the indicator lights on the instrument panel will signal various operating conditions of the engine and the tractor. A cable is connected to the circuit board which carries the printed circuit as well as the light bulbs which operate responsive to the sensed conditions. The light bulbs are positioned in compartments which are covered by a window carrying a symbol to indicate to the operator the operating conditions on the vehicle. Accordingly, this invention simplifies the wiring by bringing the wires into the instrument panel in a cable with connectors in a plug and socket arrangement which connects the circuit between the indicator lights to the sensors on the vehicle to simplify the assembly and repair of the system in general.

Accordingly, it is an object of this invention to provide a lighting arrangement on an instrument panel on a motor vehicle.

It is another object of this invention to provide a plurality of compartments containing light bulbs mounted on a circuit board with the lights directing illumination through windows on the instrument panel to indicate to the operator the sensed condition on the motor vehicle.

It is a further object of this invnetion to provide a circuit board carrying the electrical circuits including light bulbs which are positioned in compartments on the instrument panel and a reflector for directing light through windows on the instrument panel to indicate to the operator a sensed condition on the motor vehicle.

It is a further object of this invention to provide a circuit board carrying a printed circuit and supporting indicator lights with reflectors for reflecting a signal through windows on the instrument panel. The circuit board is connected through a connector to a cable of a plurality of conductors to sensors on the motor vehicle for providing signals visable on the instrument panel as to the operating conditions of the vehicle.

The objects of this invention are accomplished by providing an instrument panel on a vehicle with gauges, controls and lights for indicators to indicate to the operator operating conditions of the vehicle. The instrument panel is constructed with compartments adjacent the panel surface which faces the operator and the compartments extend from the panel surface to receive light bulbs in the indicator circuit. Windows are provided on the panel surface to indicate the various sensed conditions on the vehicle. A circuit board carries resistors, transistors and light bulbs of the indicator of which the bulbs extend into the compartments to provide the indication to the operator when the bulbs are lighted.

A cable is connected through prongs and sockets to connect the circuit board to the sensory circuit on the motor vehicle. The circuit board is mounted on the backside of the compartments with the bulbs extending into the compartments and a reflector at the base of the bulbs to reflect light through the windows to indicate to the operator the sensed condition on the motor vehicle.

Referring to the drawings, the preferred embodiment of this invention is illustrated.

FIG. 4 is a three-dimensional view and a partially exploded view of the backside of the instrument panel;

FIG. 5 is a three-dimensional view showing the front side of the instrument panel;

FIG. 6 is the front view of the reflector;

FIG. 7 is a side view of the reflector shown in FIG. 6;

FIG. 8 is a cross-section view taken on line VIII—VIII of FIG. 4;

FIG. 9 is the front view of the circuit board;

FIG. 10 is a side view of the circuit board; and

FIG. 11 is the back view showing the electrical printed circuit on the circuit board.

Figure 1:
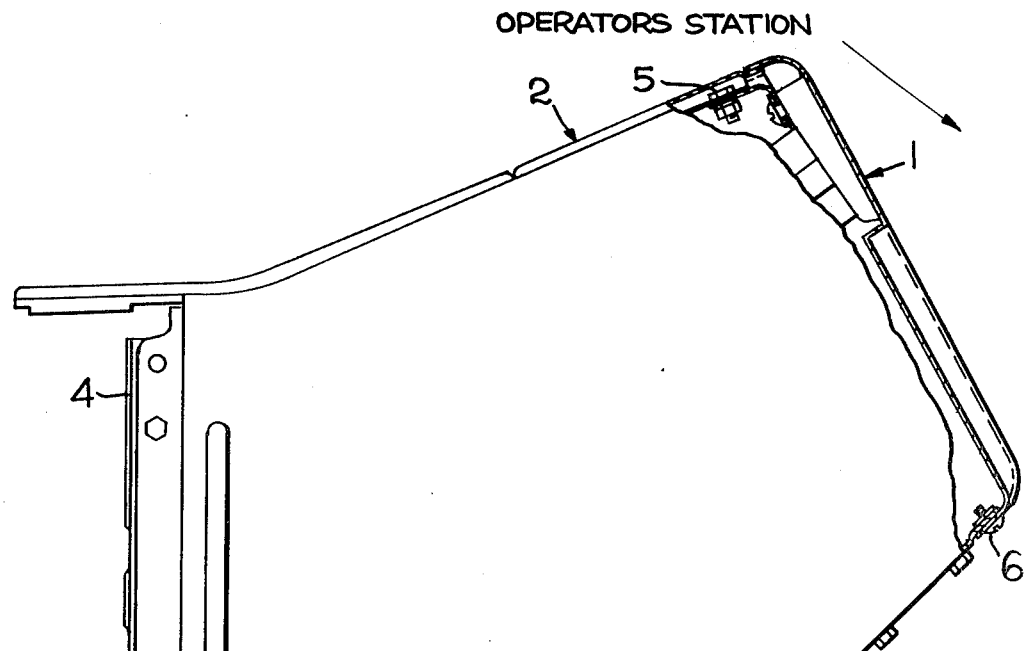
FIG. 1 illustrates a partially sectioned side elevation view of a control module with an instrument panel mounted thereon.

Referring to the drawings, the instrument panel 1 is shown mounted as an integral part of the control console 2. The control console 2 is suitably mounted on the vehicle by means of a supporting structure 3 and the firewall 4 on the forward side of the control console. The instrument panel 1 is connected for mounting by means of a plurality of bolts of which bolts 5 and 6 are shown.

Figure 2:
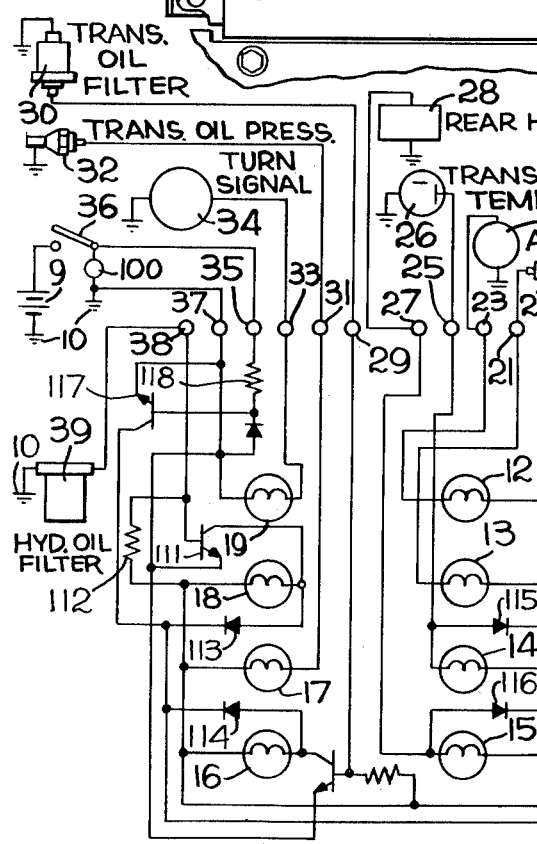
FIG. 2 is an electrical circuit including the sensory circuits and the indicator circuit for indicating the sensed conditions on the motor vehicle.

FIG. 2 shows the indicator circuit 7 connected through connectors to the sensory circuits 8. The circuits are energized by the battery 9 connected between ground 10 and line 11. The battery supplies the electrical energy to operate the lighting of the bulbs 12, 13, 14, 15, 16, 17, 18 and 19 through line 11 connected to terminal 20. Terminal 21 is connected to the oil pressure sensor 22. Terminal 23 is connected to the alternator 24. Terminal 25 is connected to the transmission oil temperature sensor 26. Terminal 27 is connected to the rear housing temperature sensor 28. Terminal 29 is connected to the transmission oil filter switch which is in the filter assembly 30. The switch operates when there is a defective filter. Terminal 31 is connected to the transmission oil pressure sensor 32. Terminal 33 is connected to the turn signal circuit 34. Terminal 35 is connected through the starter 100 to ground and through the starter switch 36 to battery 9. Terminal 37 is connected to ground 10. Terminal 38 is connected to the hydraulic oil filter warning switch in the hydraulic oil filter assembly 39.

The instrument panel 1 is supported on its upper end on the bracket 41 and the bracket 41 is connected to the control console by bolts 5 and 6 in the bolt holes shown. The lower portion of the instrument panel is similarly bolted as an integral part of the control console by means of bolt 6 as indicated in FIG. 1.

The instrument panel carries the tachometer 42 and the water temperature gauge 43. The ignition switch 44 and starter button 45 are also mounted on the instrument panel. The ethyl injector button 46 is mounted on the control panel as well as the light switch 47 and the turn signal switch 48. These components are generally indicated in FIGS. 4 and 5. Suitable electrical connections are provided between the indicator circuit 7 on the instrument panel and sensory circuits 8.

The circuit board 49 is mounted by means of a plurality of screws 50 of which one is shown. The reflector 51 is seated at the base 52 of the bulbs 53. These components are mounted on the box 54 on the instrument panel which forms a plurality of compartments for receiving the bulbs.

FIG. 8 shows a portion of the instrument panel carrying the pane 55 and the box 54 forming the compartments 56, 57, 58 and 59. The internal surface of these compartments has a high gloss reflective surface to improve the efficiency of the light reflected toward the windows formed by the pane 55.

Figure 3:
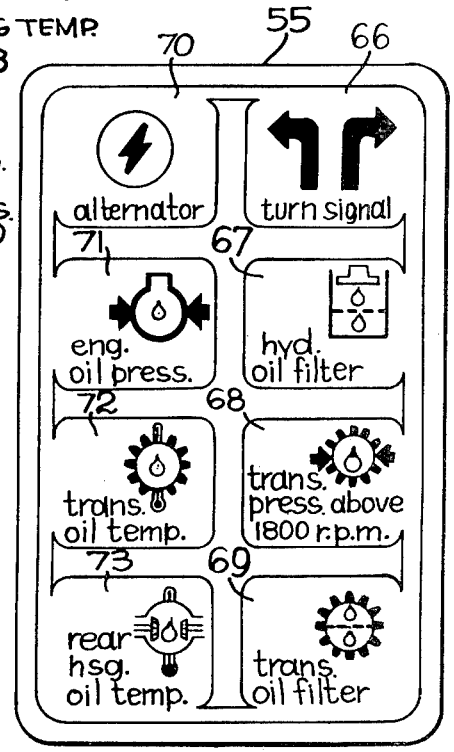
FIG. 3 is a front view of the indicator windows.

The pane 55 forming a plurality of windows is shown in FIG. 3 and will be described subsequently.

FIGS. 9, 10 and 11 show the circuit board 49. The printed circuit shown on FIG. 11 is the electrical circuit shown in FIG. 2 and the connectors are identified as the terminals between circuits. The bulbs shown in FIG. 2 are also identified in FIG. 8. The bulbs project into the compartments shown in box 54 of FIGS. 4 and 8. The bulbs 12, 13, 14 and 15 as shown in FIG. 9, would extend into the compartments 56, 57, 58 and 59. Similarly the bulbs 19, 18, 17 and 16 would extend into the compartments 60, 61, 62 and 63. Since the circuit board 49 would not have reflective characteristics, the reflector 51 formed of resilient material such as polyester foam and having an aluminized Mylar surface 64, is positioned on the circuit board. The aluminized Mylar surface 64 engages the end surface 65 of the box 54 and reflects light in each of the compartments toward the windows. The resistors and transistors and the base of the bulbs as well as the circuit board are all covered by the reflector 51 when assembled. The resilient material of the reflector 51 conforms to the circuit board at the adjoining interface when assembled.

The pane 55 covers the ends of the compartments in the box 54 on the panel surface. The pane 55 forms eight windows shown in FIG. 3 which include the turn signal window 66, the hydraulic oil filter window 67, the transmission pressure window 68 and transmission oil filter window 69, as well as the alternator window 70, the engine oil pressure window 71, the transmission oil temperature window 72 and the rear housing oil temperature 73.

Each of these windows includes a symbol as well as a printed readout on each window. Each window is lighted when the bulb beneath the window is lighted. This signals to the operator a warning of the condition sensed from the sensory circuit which is electrically transmitted to light the bulb through an electrical signal. Accordingly, the parameters sensed on the vehicle generates a signal which is transmitted from the sensory circuit to the indicator circuit to light the bulb to inform the operator of the various conditions sensed in the vehicle.

The operation of the indicator lighting arrangement operates in the following described manner.

When the alternator 24 is not charging, it is sensed by the regulator circuit of the alternator 24 allowing a current flow which illuminates the bulb 12 and cautions the operator the alternator is not operating properly.

When the oil pressure in the engine drops below a predetermined value, the engine oil pressure switch 22 closes and the light 13 illuminates providing a warning to the operator that engine oil pressure is low.

When the transmission oil temperature is above a predetermined value, a temperature sensor 26 senses the temperature and closes the circuit through the indicator circuit and the light 14 is illuminated to warn the operator that the transmission oil temperature is excessively high.

When the rear housing oil temperature on the vehicle is above a predetermined value, this also is sensed by the rear housing temperature sensor 28 and a switch is closed to the indicator circuit illuminating the light 15 which in turn warns the operator by illuminating the window 73 of the window 55.

When the turn signal switch 34 is closed in either of two directions, current flows through switch 34 which flows through the bulb 19 and illuminates window 66 indicating to the operator a turn signal switch is closed.

When the hydraulic oil filter in the hydraulic system for auxiliary equipment is not filtering properly, the hydraulic oil bypasses the filter opening a valve and a switch which in turn generates a signal which illuminates the light 18 and window 67 indicating to the operator that the hydraulic oil filter is defective and should be replaced.

When the transmission oil pressure falls below a predetermined value, the drop-in pressure is sensed by the pressure sensor 32 and current flows through the light 17 which is then lighted. As light 17 is lit, it illuminates the window 68 and this indicates to the operator the pressure has fallen below a predetermined value and the hyudraulic system is not operating properly.

Similarly when the transmission oil filter has become defective and oil is bypassing the filter, a bypass switch is opened which in turn causes an electrical signal to flow through the indicator circuit and the light 16 is illuminated. As light 16 is illuminated, the window 69 is illuminated which warns the operator that the transmission oil filter is defective.

The starter switch 36 is also connected to the indicator light circuit and tests the operativeness of the indicator lights 14, 15, 16 and 18 when the starter switch is closed. The switch is operated manually to start the engine on the vehicle and simultaneously provides a test for circuits.

The indicator light arrangement accordingly is a compact, easily assembled unit. The system can also be serviced readily either by replacing any component in the assembly or replacing the whole unit if desired.

Three different circuit functions are provided on the warning light assembly circuit. A simple warning light and sensor switch circuit where circuit board provides the circuit path to the warning light, wherein the system battery 9 is connected to circuit board through external wire to terminal pin 20 of integral connector 110, then from 20 to warning light 17, then from warning light 17 to integral connector pin 31, from connector pin 31 to sensor switch 32 via external wire. Sensor switch 32 and a battery 9 are also connected to common ground 10. Closing of sensor switch completes the circuit for lighting the warning light.

In the case where a sensor switch provides a normally closed circuit, a logical inversion of the electrical signal must be provided. An example of this circuit is the hydraulic filter warning circuit provided on the circuit board. System battery 9 is connected to the circuit board through external wire connected to terminal pin 20 of integral connector 110, then from pin 20 to warning light 18. Light 18 is also connected to transistor 111. External sensor switch located in hydraulic oil filter 39 is connected with external wire to terminal pin 38 of integral connector, then from pin 38 to base of transistor 111. Also, resistor 112 is connected from base of transistor 111 to system battery via pin 20 of integral connector. In normal operation, sensor switch in hydraulic filter 39 is closed to ground 10 preventing bias current through resistor 112 from being applied to transistor 111 thus keeping transistor 111 in an "off" state and not providing a path to ground 10 for warning light 18. The warning light 18 is not lighted. When a warning condition is sensed by sensor switch in the hydraulic oil filter 39, the switch opens permitting bias current to flow through resistor 112 thereby turning on transistor 111 thus completing circuit path through warning light 18 to ground 10 lighting the warning light 18.

A circuit is provided to furnish a "light bulb test" function to those lights that would not be lighted except in case of a warning condition. System battery 9 is connected to circuit board through external wire to terminal pin 20 of integral connector 110. Then it is connected to the various warning lights 14, 15, 16, 17. The warning lights are connected through diodes 113, 114, 115, 116 to collector of transistor 117. The emitter of transistor 117 is connected to ground 10. A resistor 118 is connected from base of transistor 117 to pin 35 of integral connector. From pin 35, an external wire connects the circuit to the vehicle starter switch 36. When starter switch 36 is closed, current flows through resistor 118 to base of transistor 117 turning it on. Current then can pass through warning lights 14, 15, 16, 17 and diodes 113, 114, 115, 116 to ground 10. This lights the lamps to verify their operation.

The embodiments of the invention in which an exclusive property or privilege is claimed are defined as follows:

1. A lighting assembly on an instrument panel of a tractor comprising, an instrument panel including a plurality of windows defining a panel surface mounted for facing an operator station, compartment means integral with said instrument panel defining a plurality of compartments extending from said panel surface into said instrument panel, each one window of said plurality of windows forming a portion of said panel surface of said instrument panel covering an end of one of said compartments, each window including a different indicator with each for indicating one of the conditions sensed in the tractor, a removable circuit board removably mounted on said compartment means, an electrical indicator lighting circuit supported on said circuit board including, a light bulb testing circuit in said electrical indicator lighting circuit for indicating operativeness of light bulbs in said circuit when a test switch is closed, a plurality of light bulbs each indicating a sensed condition and having a base mounted on said circuit board in said electrical indicator lighting circuit with each one of said light bulbs extending into one of said plurality of compartments, a resilient reflector mounted on said circuit board and engaging the inner end of said compartment means, a reflecting surface including a portion on the end of each compartment for reflecting light through the window of the compartment when the bulb in the compartment is lighted, means removably fastening said circuit board and compressively retaining said reflector between said compartment means and said circuit board, a sensory circuit sensing a plurality of conditions on said tractor, a cable extending into said instrument panel and a connector removably connecting said sensory circuit to said electrical indicator lighting circuit for lighting bulbs in response to the sensed conditions.

2. A lighting assembly on an instrument panel of a tractor as set forth in claim 1 including a prong and socket connector, terminals on said circuit board, said cable in said instrument panel carrying said connector for connecting said prongs to said terminals on said circuit board for connecting said sensory circuit to said indicator lighting circuit.

3. A lighting assembly on an instrument panel of a tractor as set forth in claim 1 including an aluminized surface on said reflector having a portion in each compartment for reflecting light from the bulbs for transmission through said compartments and said windows.

4. A lighting assembly on an instrument panel of a tractor as set forth in claim 1 wherein said resilient reflector includes aluminized Mylar and defines perforations with each perforation receiving one of said bulbs, said aluminized Mylar forming a surface on said reflector reflecting light from said bulbs through said compartments and windows in said instrument panel.

5. A lighting assembly on an instrument panel of a tractor as set forth in claim 1 wherein said electrical indicator lighting circuit includes a normally closed circuit providing logical inversion of electrical signal for warning of defective operation sensed in the tractor.

6. A lighting assembly on an instrument panel of a tractor as set forth in claim 1 wherein at least one of said windows provides an indication of oil pressure in said vehicle.

7. A lighting assembly on an instrument panel of a tractor as set forth in claim 1 wherein at least one of said windows indicates a temperature sensed on said vehicle.

8. A lighting assembly on an instrument panel of a tractor as set forth in claim 1 wherein said electrical circuit defines a printed circuit on said circuit board including a plurality of transistors, resistors, diodes and bulbs, means for supporting said bulbs for extending into said compartments.

9. A lighting assembly on an instrument panel of a tractor as set forth in claim 1 wherein at least one of said windows indicates an electrical condition in one of the accessories on said tractor.

10. A lighting assembly on an instrument panel of a tractor as set forth in claim 1 wherein at least one of said windows indicates the condition of a filter on said tractor.

* * * * *